June 4, 1968     H. NERWIN     3,386,360

FLASH FILTER

Filed July 12, 1965

HUBERT NERWIN
INVENTOR.

BY R. Frank Smith
Ronald S. Vanchon
ATTORNEYS

3,386,360
FLASH FILTER
Hubert Nerwin, Rochester, N.Y., assignor to Eastman Kodak Company, Rochester, N.Y., a corporation of New Jersey
Filed July 12, 1965, Ser. No. 471,180
4 Claims. (Cl. 95—11)

ABSTRACT OF THE DISCLOSURE

An adjustable filter cap overlying the lamp(s) and reflector(s) of a camera flash attachment, particularly a multilamp flash unit such as a flashcube, the cap having one or more walls varying in a light-transmitting characteristic, such as neutral density, to modify lamp output in accordance with a variable picture-taking factor, such as camera-to-subject distance; and a device interconnecting the filter cap and an adjustable camera mechanism, such as that for adjusting lens focus or diaphragm aperture, whereby both the filter cap and camera mechanism can be adjusted simultaneously to correspond with a particular value of the picture-taking factor.

---

The present invention relates to flash photography, and more particularly, to density filters for use with multi-lamp photoflash packages.

There has recently been developed a disposable, unitary multilamp package, disclosed for example in U.S. patent applications Ser. No. 417,913, now patent No. 3,353,465, and Ser. No. 417,914, now patent No. 3,327,-105, both filed Dec. 14, 1964. Such a package comprises a base on which are mounted a plurality of photoflash lamps and individual reflectors, all of which are enclosed by a light transmitting shield or cover.

In all instances, it is contemplated that such packages will include flash lamps having constant light output values, thereby permitting the rapid taking of a sequence of flash pictures. I have devised a filter arrangement which will permit adaptation of such packages to variable picture taking factors, as, for example, camera to subject distance.

An important object of my invention resides, therefore, in the provision of a filter attachment for use with photo-flash lamps, the filter attachment varying light output from a flashlamp according to a variable factor such as distance.

Yet another object resides in the provision of a filter attachment which is operatively connected to an adjustable camera mechanism, such as lens focus, to adjust the mechanism in accordance with the light output value desired.

These and other objects and advantages will become more apparent during the course of the following description, the accompanying drawing forming a part thereof and wherein.

As disclosed in the U.S. applications Ser. Nos. 417,913 and 417,914, a multilamp package may be of cubic shape with four photoflash lamps and reflectors vertically disposed on respective lateral sides of an attaching base. A transparent cover overlies the lamps and individual reflectors.

Figure 1:
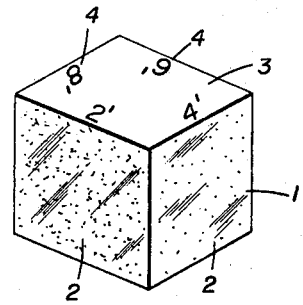
FIG. 1 shows one embodiment of the filter attachment according to my invention.

Referring to FIG. 1, one form of my invention comprises a simple and inexpensive cap 1 which has internal dimensions and shape permitting the cap 1 to fit firmly over the cover of a multilamp package. The cap 1 includes side walls 2 in equivalent number to the number of lamp sides, and a top wall 3. Each side wall 2 has a predetermined neutral light transmitting density value which will alter the light output to an intensity suitable for a particular camera to subject distance. Thus, the sides 2 may vary in density from a maximum corresponding to a distance of two feet to a minimum density corresponding to a distance of eight feet. Distance numerals 4 may be provided for ready reference.

When taking a flash picture, the camera to subject distance is measured and the cap 1 placed over the lamp package with the corresponding side 2 over the lamp in the flash circuit to reduce the light output from the lamp when fired. After each flash exposure, the filter cap 1 may then be removed for reuse as desired.

Figure 3:
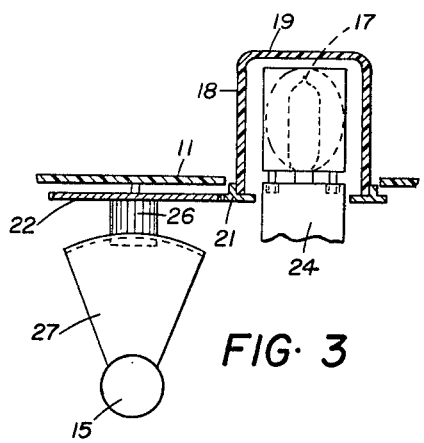
FIG. 3 is a partial front view of the mechanism shown in FIG. 2.
Figure 2:
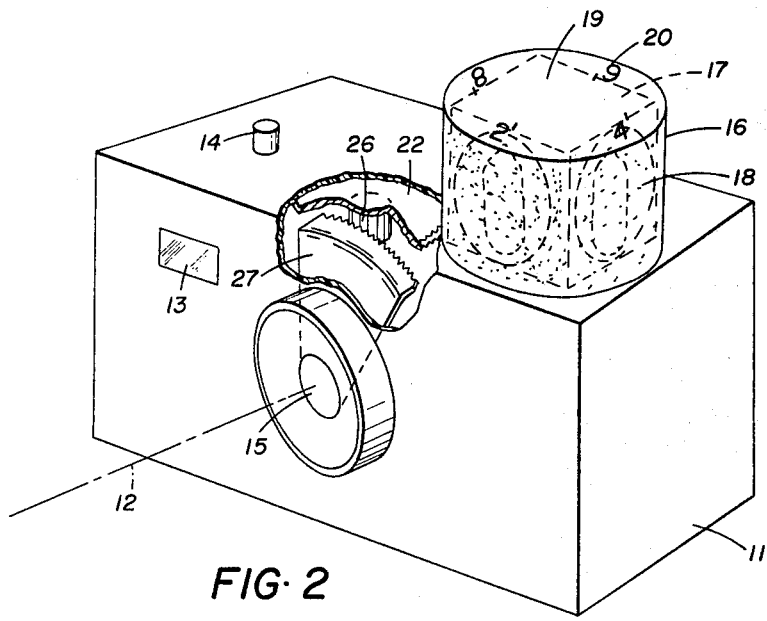
FIG. 2 shows a second embodiment of the invention, wherein the filter attachment is operatively connected to camera focus.

Referring to FIGS. 2 and 3, my invention may suitably be included in a photographic camera, such as disclosed in U.S. application Ser. No. 438,585, now patent No. 3,335,651, filed Mar. 10, 1965.

A suitable camera comprises a light tight housing 11 having a picture taking axis 12 on which are located the usual elements such as lens assembly 15, diaphragm, shutter mechanism and a frame of roll of photosensitive film. There are also provided a view finder 13 and camera operating button 14 in a known manner. After each exposure the film may be wound and the camera reset by any known mechanism.

According to my invention, the camera is provided with a detachable filter cap 16 of cylindric shape having an annular side wall 18 and a top wall 19. The cap 16 fits over an inserted lamp package 17 as shown, and the side wall 16 has about its circumference a varying neutral light transmitting density varying from maximum for the minimum expected distance to a minimum density at the maximum flash distance. As shown in FIG. 2, the distance is shown by numerals 20 to vary from two feet to eight feet, and the change in density is preferably stepped.

The lower edge of cap 16 fits onto a rotatably mounted, geared ring receiver 21 which is coaxial with the package receiving socket 24 of the camera. The filter cap 16 and ring 21 may define an assymmetrical key means which will permit attachment of the cap 16 in one predetermined position only.

Ring 21 is geared to a rotatable gear 22 which is coaxial and integral with a spur gear 26. Meshing with gear 26 is a sector gear 27 which is operatively connected to the camera lens assembly 15 for angular movement about the lens axis 12. The lens 15 comprises an adjustable focus assembly which varies focus in a known manner. Movement of sector gear 27 thus causes adjustment of the lens focus.

Whenever a particular camera to subject distance is desired for a flash exposure, the cap 16 is rotated about its vertical axis until the appropriate distance numeral faces the camera front. The interconnecting gears transmit this rotational motion to lens assembly 15 to provide a focus for the same distance.

Alternatively, lens assembly 15 may be provided with an accessible adjusting ring to vary focus, and this adjustment will correspondingly position the filter cap. In either case, ring 21 can be provided with a distance scale at its exposed surface to indicate distance with a fixed index mark on the camera housing 11. In addition, a separate superimposed filter may be included to vary density according to another factor such as diaphragm aperture. In such a case, the composite of the filter density input for distance and the filter density input for diaphragm aperture determine the light output.

While my invention has been described in relation to particular embodiments, it is obvious that various modifications can be resorted to without departing from the spirit of my invention or the scope of the subjoined claims. For example, the sides 2 of the cap 1 of FIG. 1 may have a constant density according to a given factor such as distance or film speed, so that the filter cap need not be removed and repositioned after each flash exposure. Separate caps 1 can be provided for each appropriate factor.

I claim:

1. For use in flash photography, the combination comprising an adjustable camera factor, wherein the camera factor is an adjustable lens focus; an adjustable filter cap overlying a flash attachment, the filter cap having a varying neutral light transmitting density; and means interconnecting the filter cap and camera factor to adjust the filter cap to transmit a predetermined emitted light corresponding to the adjusted value of the camera factor, wherein the interconnecting means comprises a rotatable ring on which the filter cap is positioned.

2. Ror use in flash photography, the combination comprising:
   (a) a variable camera mechanism;
   (b) a photoflash source having a variable light-emitting characteristic, wherein said photoflash source comprises a movable filter overlying a flash lamp, said filter having a varying light-transmitting characteristic; and
   (c) means interconnecting said mechanism and said source to effect simultaneous variation thereof as either one of said mechanism and source is varied, wherein said interconnecting means comprises a rotatable member on which said filter is positioned for rotation around said lamp.

3. For use with a photoflash camera having a lens focusing mechanism, the combination comprising:
   (a) a rotatable filter cap overlying a multilamp flash unit attached to said camera, said filter cap defining a cylindrical side wall having a varying neutral density around its circumference for transmitting a predetermined amount of emitted flash illumination corresponding to the angular position of said filter cap; and
   (b) motion-transmitting means interconnecting said filter cap and said focusing mechanism to effect simultaneous variation of flash-illumination intensity and lens focus as one of said cap and mechanism is adjusted in accordance with camera-to-subject distance.

4. For use in flash photography, the combination comprising:
   (a) a variable camera mechanism;
   (b) a movable filter overlying a photoflash lamp at least in the direction of light transmission and having a light-transmitting characteristic that varies in the direction of filter movement; and
   (c) means interconnecting said mechanism and said filter to effect simultaneous variation of said mechanism in response to movement of said filter, said interconnecting means including a movable member on which said filter is supported for movement relative to said lamp.

References Cited

UNITED STATES PATENTS

| | | | |
|---|---|---|---|
| 3,296,947 | 1/1967 | Englesmann et al. | 95—11.5 XR |
| 2,213,749 | 9/1940 | Strauss | 95—11 |
| 2,301,419 | 11/1942 | Lew | 350—314 X |
| 2,979,601 | 4/1961 | McClees | 240—1.3 |
| 3,167,256 | 1/1965 | Elliott | 240—1.3 |
| 3,244,087 | 4/1966 | Anderson et al. | 240—1.3 XR |

NORTON ANSHER, *Primary Examiner.*

F. L. BRAUN, *Assistant Examiner.*